Patented Dec. 15, 1942

2,305,513

UNITED STATES PATENT OFFICE 2,305,513

γ-ACETYL-γ-ISOPROPENYL PIMELONITRILE AND METHOD FOR ITS PREPARATION

Herman A. Bruson, Philadelphia, Pa., assignor to The Resinous Products & Chemical Company, Philadelphia, Pa., a corporation of Delaware No Drawing. Application December 2, 1941, Serial No. 421,315

3 Claims. (Cl. 260—464)

This invention relates to γ-acetyl-γ-isopropenyl pimelonitrile, a new substance having the formula:

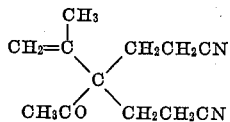

and a method for its preparation.

This compound is a valuable intermediate for the preparation of synthetic resins.

According to the present disclosure which is a continuation-in-part of my copending application Serial No. 389,332, filed April 19, 1941, the above compound is obtained by condensing mesityl oxide in the presence of an alkaline condensing agent with acrylonitrile. The mesityl oxide reacts in its desmotropic form according to the equations:

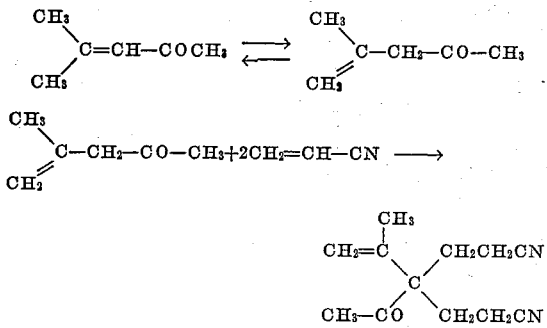

Typical alkaline condensing agents which can be used include the oxides, hydroxides, amides, hydrides, alcoholates or phenolates of the alkali metals, the alkali metals themselves or strongly basic non-metallic hydroxides such as quaternary ammonium hydroxides. Of these agents, one of the most effective is the aqueous 40% solution of trimethyl benzyl ammonium hydroxide.

The quantity of alkaline condensing agent used is small, amounts of the order of 0.5% to 5% on the combined weight of the reactants being sufficient to catalyze the reaction.

The reaction can be carried out with or without the use of an auxiliary inert solvent such as benzene, dioxane, tertiary butanol or water. It takes place at temperatures as low as 0° C. and is greatly accelerated at temperatures from about 35° to 80° C. Since the reaction is exothermal, it is advantageous to use an inert solvent and to regulate the vigor of the reaction by the rate of addition of the acrylonitrile or by suitable cooling.

The following example illustrates this invention:

*Condensation of mesityl oxide and acrylonitrile*

A mixture consisting of 98 g. of mesityl oxide, 100 g. of tertiary butanol and 5 g. of aqueous 40% trimethyl benzyl ammonium hydroxide was cooled to 5–10° C. and rapidly stirred while there was added dropwise 106 g. of acrylonitrile during the course of 1¾ hours while the reaction temperature was maintained between 5° and 10° C. The mixture was then stirred for 1½ hours longer at 5° to 10° C. and finally neutralized with dilute hydrochloric acid. The crystalline product was filtered off by suction, washed with a little ice-cold ethanol, and air-dried. The yield was 150 grams of crude γ-acetyl-γ-isopropenyl pimelonitrile

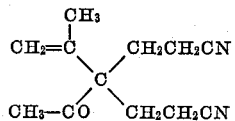

which, after recrystallization from methanol, formed colorless crystals melting at 116–117° C. Upon hydrolysis with aqueous sodium hydroxide, γ-acetyl-γ-isopropenyl pimelonitrile yields the corresponding γ-acetyl-γ-isopropenyl pimelic acid melting, when pure, at 136–137° C.

I claim:

1. A method for preparing γ-acetyl-γ-isopropenyl pimelonitrile which comprises condensing mesityl oxide in the presence of an alkaline condensing agent with acrylonitrile.

2. A method for preparing γ-acetyl-γ-isopropenyl pimelonitrile which comprises condensing mesityl oxide in the presence of trimethyl benzyl ammonium hydroxide with acrylonitrile.

3. As a new compound, γ-acetyl-γ-isopropenyl pimelonitrile having the formula:

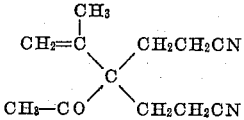

which, when pure, is a crystalline compound melting at 116–117° C.

HERMAN A. BRUSON.